UNITED STATES PATENT OFFICE.

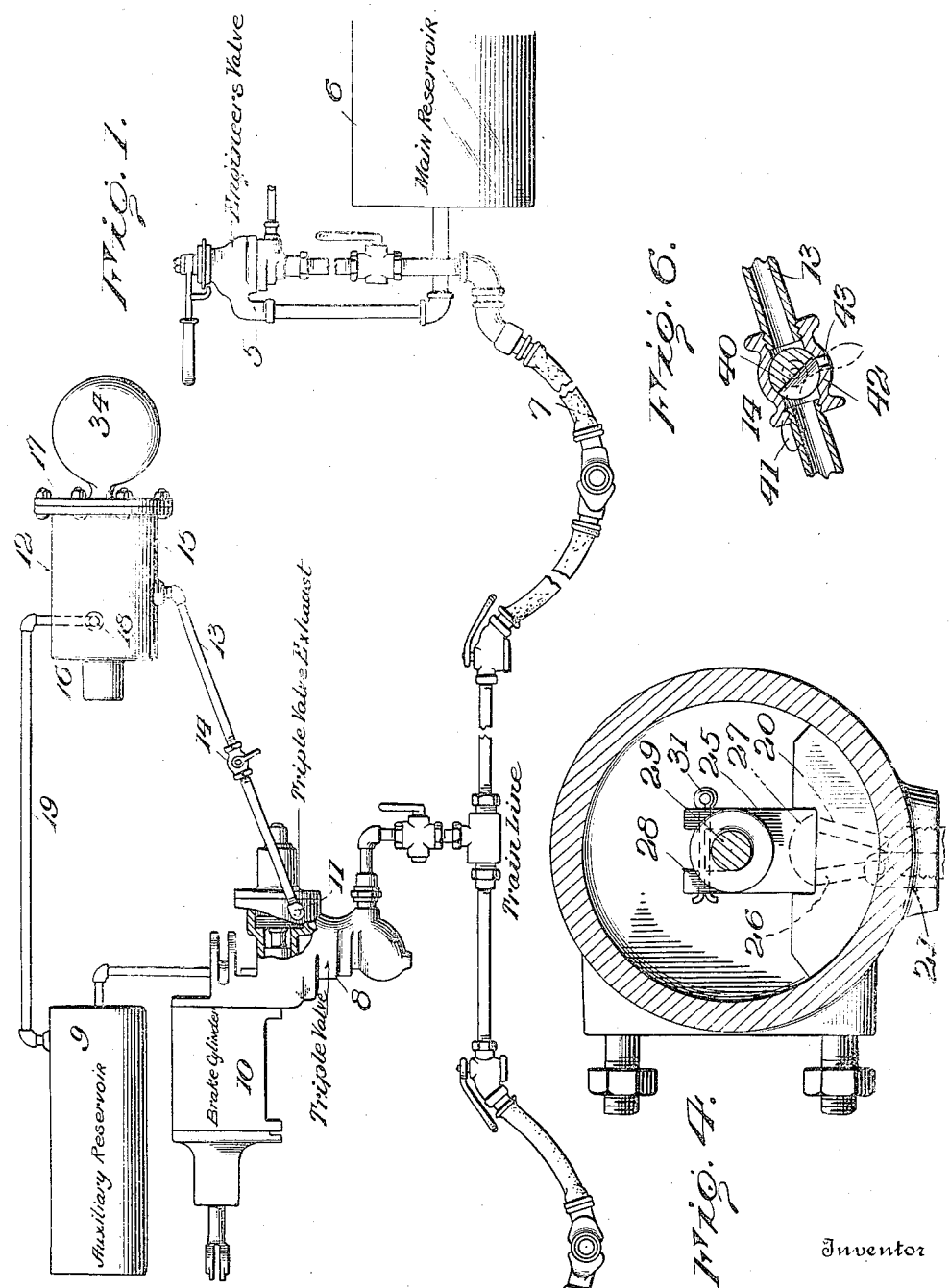

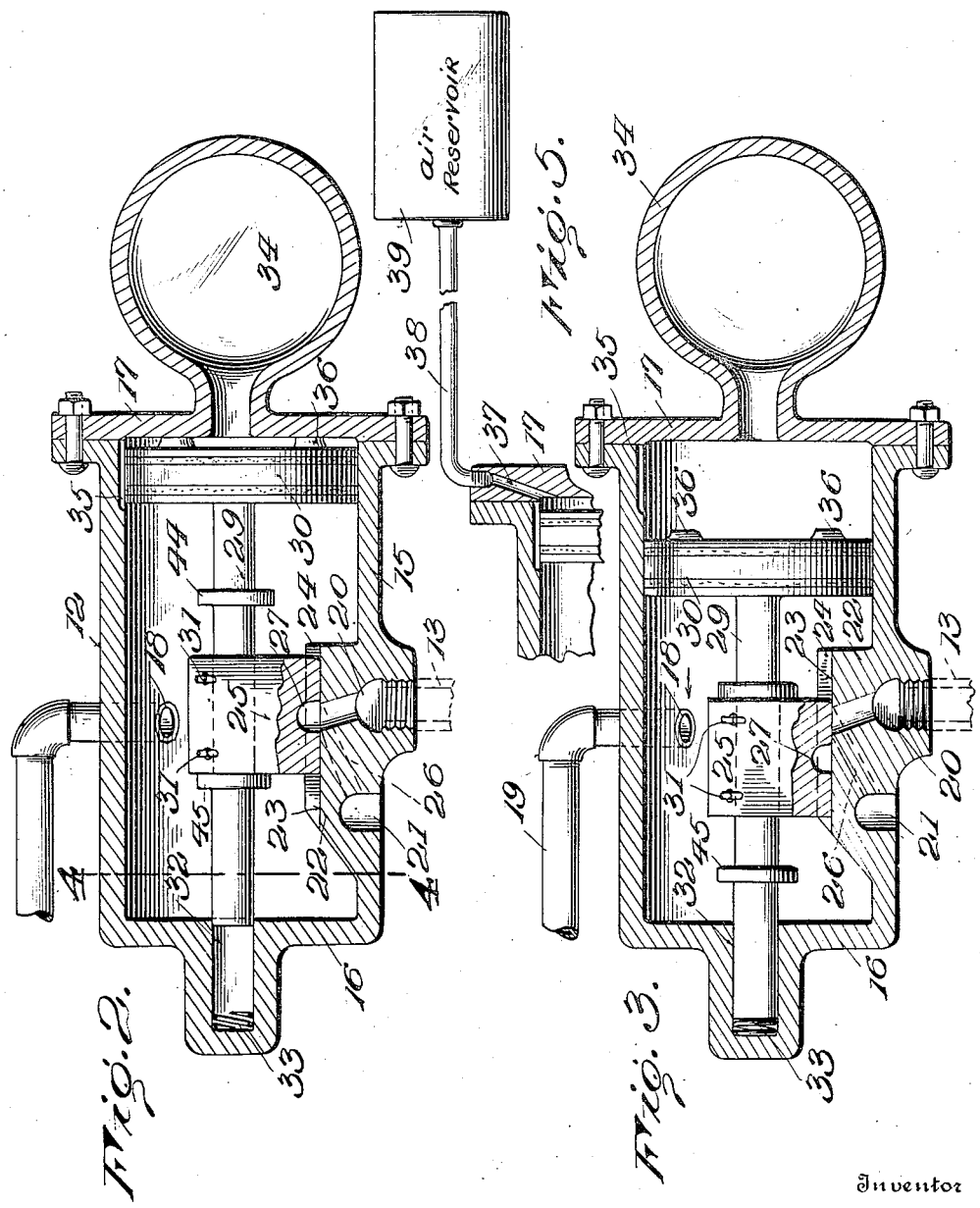

FRANK S. CRAVENS, OF LEXINGTON, KENTUCKY.

AIR-BRAKE.

1,306,526.   Specification of Letters Patent.   Patented June 10, 1919.

Application filed August 9, 1917. Serial No. 185,355.

*To all whom it may concern:*

Be it known that I, FRANK S. CRAVENS, a citizen of the United States, residing at Lexington, in the county of Fayette and State of Kentucky, have invented new and useful Improvements in Air-Brakes, of which the following is a specification.

This invention relates to air brake systems, and particularly to the brake complement applied to each car.

The primary object of the invention is to provide means in automatic active association with each car brake complement for retaining a strong application of the brakes on the cars of a train during descent of a steep grade for an interval long enough to check a too rapid movement down grade and at the same time permit restoration of the normal air pressure in the auxiliary cylinder to effect a resetting of the brake cylinder and of the retaining means so that immediately after a brake release under steep grade movement and checking conditions, further strong application of the brakes may be made as desired and found necessary to control the train as to regular movement without strain or injury to the cars and draw bars and relative components thereof, and also to avoid stalling a train by heavy brake application.

A further object of the invention is to replace manually operated retaining means for maintaining a heavy braking pressure on the cars of the train during descent of a steep grade by automatically operating means which do not need the least manual attention and have a sure or certain actuation and capable of being readily installed in connection with the usual car brake complement without materially modifying the latter. A still further object of the invention is to provide a retaining means for the brake complement of the car that will not operate, except under heavy braking pressure when a train is descending a steep grade, and thereby avoid interference with the usual application of the brakes on a level of light grade.

With these and other objects and advantages in view, as will be hereinafter more fully enumerated, the invention consists essentially in providing means in connection with the brake complement of each car for automatically checking the exhaust from the triple valve to the atmosphere for a certain length of time after the brakes have been set and to effect a sufficiently slow action of the said means in returning to normal position after release of the brakes so as to insure a full restoration of the charging pressure in the auxiliary cylinder and a resetting of the brake cylinder to normal condition and whereby the brakes may at any time after they return to released position be operated to set them and obtain the same retaining action. The invention further consists in providing means in operative association with the automatic retaining means included in the brake complement of each car of a manually controlled rear end release valve whereby a certain number of cars at the front of a train may be set for retained application of the brakes and the remaining rear cars of the train have a normal braking application and exhaust the air to the atmosphere or have a rear end release when the brakes of the first mentioned cars are still retained applied. The invention still further consists in the construction and arrangement of the several parts which will be more fully hereinafter described and claimed.

In the accompanying drawing:

Figure 1 is a diagrammatic view showing a car brake complement together with an engineer's valve and a portion of the main reservoir connected thereto and embodying the features of the invention, the triple valve of the car brake complement being partially broken away.

Fig. 2 is a longitudinal vertical section, on an enlarged scale, of the retaining valve forming the essential feature of the invention, and showing the valve proper in position to permit exhaust of the air from the triple valve.

Fig. 3 is a view similar to Fig. 2 with the valve proper in a different or closed position for retaining or obstructing the exhaust air from the triple valve.

Fig. 4 is a detail transverse vertical section taken in the plane of the line 4—4, Fig. 2.

Fig. 5 is a detail sectional view showing a slight modification in the structure of the retaining valve.

Fig. 6 is a detail sectional view, on an enlarged scale, of the rear end release valve also embodying one of the features of the invention.

The numeral 5 designates an engineer's valve connected to the main reservoir 6 and also to a train line or pipe 7. The car brake complement comprises a triple valve 8 connected to the train line 7, as shown, and also to an auxiliary reservoir 9 and brake cylinder 10, the triple valve having the usual exhaust 11 as indicated by Fig. 1. All the features of construction of the brake as thus far described, are well-known in brake mechanism as now commonly used in connection with cars or as a brake complement for each car under control of the engineer's valve from the cab of the engine. The improvements comprise a retaining valve 12 and a pipe connection 13 between the exhaust 11 of the triple valve 8 and a portion of the retaining valve 12. In the pipe connection 13 between the exhaust 11 of the triple valve 8 and retaining valve 12 is a rear end release valve 14 shown on an enlarged scale in section by Fig. 6.

The retaining valve 12 comprises a cylindrical casing 15 with front and rear heads 16 and 17, casing 15 being provided with a tap or threaded coupling means 18 for attachment of one end of a pipe 19 which also connects with the auxiliary reservoir 9 as shown by Fig. 1. At a suitable point in the lower portion of the main casing or body 15 of the retaining valve 12 are adjacently situated ports 20 and 21, the pipe 13 from the exhaust 11 of the triple valve 8 being connected to the port 20 as shown, port 21 being always clear to the atmosphere. The ports 20 and 21 are formed in an inner enlargement or valve seat 22 which projects into the interior of the casing 15 and is provided with an upper horizontal surface 23 with side guard flanges 24, and on the said horizontal surface between the guard flanges a slide valve 25 is mounted to have horizontal shifting movement. The port 20 continues upwardly through the valve seat and its upper open end is exposed through the horizontal top surface 23 of said seat, and in transverse alinement with this port 20 a second port 26 opens through said horizontal surface and extends downwardly and forwardly at a downward angle of inclination and opens into and communicates with the port 21. The bottom of the slide valve 25 has a cavity 27 of such transverse dimensions or extent as to bridge the two ports opening through horizontal surface 23 of the valve seat 22. The slide valve 25 is preferably of block form, and its contour and general dimensions may be varied, it being only necessary to have this slide valve open and close communication between the ports during the operation or performance of function of the improved retaining valve. As shown by Fig. 4, the upper part of the slide valve 25 is formed with a channel or groove 28 and mounted to move in this channel or groove is a piston rod 29 fast to or forming an integral part of an equalizing and graduating piston 30 which slidably engages the inner surface of the cylindrical casing 15 in rear of the valve seat 22. The piston rod 29 is held in operative relation to the slide valve 25 by cotter pins 31 or other analogous means, said piston rod 29 continuing beyond the front end of the slide valve and normally held at its front extremity in a guide opening or seat 32 provided at the center of the front head 16 of the cylindrical casing 15. The guide opening or seat 32 is of such extent as to compensate for the maximum forward movement of the piston rod 29, and as an incidental feature of construction a spring 33 may be located at the outer end of the guide seat 32 for engagement by the forward end of the piston rod 29 to facilitate the return of the said piston rod toward its normal position or to set up a starting action due to the tendency of the spring to assume its normal distended condition, such operation ensuing when the piston rod 29 and equalizing and graduating piston 30 are relieved of pressure which forces them outwardly or which moves the said piston toward the valve seat 22 and valve 25. The object of seating or guiding the front end of the piston rod 29 as just explained is to prevent cocking or any tendency to displacement of the valve 25 from its seat. The horizontal surface 23 of the valve seat 22 is of sufficient length to permit a maximum movement of the valve 25 thereon without disengagement from the seat in a longitudinal direction, and also to provide for a slow action or a dwell when said valve is shifted to close over or have the cavity 27 thereof register with the port 20 after the said valve has been operated and is returned to normal position under conditions which will be more fully hereinafter explained. The piston rod 29 is integrally formed with or otherwise connected to the piston 30 to avoid the formation of leaking joints and said piston 30 will be provided with suitable packing ring means to establish tight sliding fit thereof relatively to the inner surface of the casing 15. It will also be seen that the casing 15, head 16, valve seat 22 and piston rod seat 32 are preferably all of integral construction to avoid formation of joints that might have a tendency to leak.

The head 17, as shown by Figs. 1, 2, and 3, is formed with an air storage chamber or reservoir 34 which is preferably integral with the head, and in a part of the casing 15 a small groove or channel 35 is also formed to establish communication between the chamber formed in the said casing ahead of the piston 30 and the said chamber or reservoir 34, the rear side of the piston 30 have projections 36 to bear against the head 17 to obviate closing communication between the chamber of the casing 15 ahead or in advance of the piston 30 and the said chamber or reservoir 34. When the piston 30 is in its rearward normal position, as shown by Fig. 2, a small portion of the channel or groove 35 is exposed in advance of the piston, and a very slight movement of the piston 30 in a forward direction will close the portion of the channel or groove 35 having exposed communication with the interior of the cylinder or casing 15 ahead of said piston and thereby trap the air under pressure in the chamber or reservoir 34. As will be more fully hereinafter described, the piston 30 can only be moved forwardly as shown by Fig. 3 by the air pressure behind it and stored in the chamber or reservoir 34 when the air pressure in advance of the said piston has been appreciably reduced. A modification of the air pressure chamber or reservoir attachment in connection with the head 17 is shown by Fig. 5, the head 17 in the latter instance having a port 37 formed therein and extending therethrough to the space between the piston 30 and the head, and connected to this port is a pipe 38 which is also attached to and communicates with a chamber or reservoir 39 located a suitable distance from the said head 17. The operation of trapping the air under pressure in the chamber or reservoir 39 is precisely the same as in the chamber or reservoir 34, but it may be preferred at times to use the chamber or reservoir 39 as shown by Fig. 5.

In very long trains say, for example, in a train of eighty cars, the brakes will be set for application in about forty-five of the forward cars and the remaining cars in the rear have the brakes so adjusted that they will not be held applied and the air is allowed to escape to the rear, and to accomplish this result the rear end release valve 14 is disposed in the pipe 13. The valve 14 is of a two-way type having a turning plug 40 as clearly shown by Fig. 6, and provided with an exteriorly located operating handle 41. The valve casing 42 also has an exhaust or bleeding port 43 so that when the valve plug 40 is turned to shut off communication between the sections of the pipe 13 extending from the valve respectively to the triple valve 8 and the retaining valve 12, the exhaust air from the triple valve will escape through the port 43. When the plug 40 is turned to establish communication between the sections of the pipe 13, it closes the port 43 and the exhaust air from the triple valve will then flow to the port 20 of the retaining valve 12. Therefore, in a long train of cars, as hereinbefore noted, the number of cars specified as having the brakes arranged for application will have all the valves 14 set to close the ports 43 thereof and establish free communication between the exhausts of the triple valves 8 and the ports 20 of the retaining valves 12, while the remaining or rear cars will have the valves 14 thereof all set with the ports 43 open, and, as a consequence, the exhausts from the triple valves of these rear cars will quickly escape to the atmosphere and serve as a release. In a train where it is desired to have the brakes applied to all of the cars with maximum braking pressure, the said ports 43 of the end release valves 14 will all be closed.

Preliminarily to explaining the operation of the improved features, it should be understood that the retaining valve 12 in connection with each car brake complement always remains inoperative until it is required to serve in holding a maximum braking pressure in the train line brake cylinders in descending heavy grades when at least 20 pounds reduction of brake-pipe pressure ensues, and these retaining valves will not act under any circumstances with less reduction of brake pipe pressure and, therefore, will not interfere with the application of the brakes on a level or in traveling over light grades when a maximum braking pressure is unnecessary. At times when the brakes are applied with minimum effect or when they are used without the maximum braking pressure the piston 30 and piston rod 29 will simply slightly reciprocate in the valve 25 without disturbing the latter in the least from its normal position as shown by Fig. 2. To move this valve 25 at a certain interval when maximum braking pressure is desired, the piston rod 29 is provided with a shoulder or collar 44 which normally stands in rear of and out of contact with relation to a rear end of said valve 25, and in view of a predetermined calculation the distance between the collar 44 and the rear end of the valve 25 will be ample for all intermediate braking conditions to permit the piston 30 and piston rod 29 to reciprocate or play backwardly and forwardly without bringing the said collar forcefully in contact with the valve 25. The piston rod 29 at a suitable predetermined distance in advance of the collar 44 is provided with a second or reseating collar 45 which normally stands in engagement with the front end of the valve 25, and when, under maximum braking operations the collar 45 is moved in advance of the valve 25 by the actuation of the piston 30 and piston rod 29 as shown by Fig. 3, and a consequent displacement of the valve 25 ensues to hold the maximum braking pressure in the train line brake cylinders, the valve 25 will remain in its forward shifted position for some time after the piston rod 29 and piston 30 move back or rearwardly toward normal position and until the reseating collar 45 engages the valve 25, and by this means a dwell ensues in regard to the operation of the valve 25, said operations being due to the movement of the piston rod 29 through the valve 25.

When the auxiliary reservoir 9 and the brake cylinder 10 are charged with air pressure in the usual manner each retaining valve will be similarly charged and the pressure in the casing 15 ahead of the piston 30 as well as in rear of said piston will be uniform or in equilibrium in view of the fact that the chamber or reservoir 34 or the chamber or reservoir 39, as the case may be, becomes similarly charged by way of the channel or groove 35 and when maximum braking pressure ensues through the 20 pounds reduction of brake pipe pressure, the piston 30 and piston rod 29 will suddenly move forward in view of the reduction of the pressure in the auxiliary reservoir and the casing 15 in advance of the piston 30, and the stored air pressure behind the said piston 30 will operate to force this piston and its piston rod forwardly and immediately close the channel or groove 35 before the stored air under pressure in rear of the piston 30 will have a chance to escape from the chamber or reservoir 34 or the chamber or reservoir 39, and the air under pressure thus trapped will cause the piston 30 and its piston rod 29 to move forwardly and operate the valve 25 through the collar 44 and close the ports 20 and 26 and thereby hold the exhaust from the triple valve against escape through the port 21 to the atmosphere and thus prevent automatic instant release of the brakes which would otherwise ensue through the operation of the triple valves. As heretofore indicated, the retention of the brakes under maximum braking pressure is prolonged by reason of the fact that the valve 25 can not be returned to normal position as shown by Fig. 2 until the reseating collar 45 engages said valve, and through this dwell or interval of inaction of the said valve 25 time will be given to fully recharge the auxiliary reservoir 9 by means of the engineer's valve 5, and as soon as this reservoir is recharged and the pressure in the retaining valve ahead of the piston 30 is greater than and overcomes the pressure of the trapped air in rear of the said piston 30, the latter and the piston rod 29 will be moved rearwardly into normal position and the collar 45 will also at the proper predetermined interval engage the front end of the slide valve 25 and reseat the latter in normal position or cause the cavity 27 thereof to again register with the ports 20 and 26. The advantage of this delay movement, as heretofore indicated, is that the brakes may be retained at maximum pressure for a considerable period and also that the auxiliary reservoir may be charged prior to opening of the exhaust 11 of the triple valve 8 by way of the retaining valve 12.

The improved features will be found exceptionally advantageous, particularly the automatically operating retaining valve which replaces the usual manually operated retaining valve and, moreover, the improved features may be readily installed in connection with the usual car brake complement without in the least interfering with the system of brake devices as at present organized. The improved retaining valve as hereinbefore specifically described and as shown in the drawings will be understood as being only one practical form of such devices for obtaining the function sought or of making it possible to automatically hold a maximum braking pressure for a certain length of time in train line brake cylinders in descending heavy grades. It is proposed to use any form of delayed moving valve and also to modify the dimensions and general details of the retaining valve as described and shown as may be found necessary to render the same practicable and serviceable in operating as desired. Another advantage of the improved retaining valve is that on very long heavy grades the maximum braking pressure may be applied several times if found necessary and the improved braking means herein explained by reason of the control of the maximum braking pressure will avoid stalling long and heavy trains particularly in view of the rear end release valve which has been fully explained.

What I claim is:—

1. In an air brake system, the combination with the usual car brake complement consisting of a triple valve, brake cylinder, auxiliary reservoir, train pipe, engineer's valve and main reservoir, of an automatically operating retaining valve comprising a cylinder with a piston and rod therein and a slide valve loosely engaged by the rod, the cylinder having independent air connections to the triple valve and auxiliary reservoir, the said loose slide valve being operated in timed relation to and by the piston and rod to obstruct the atmospheric release of the exhaust from the triple valve and holding the brakes applied under maximum braking pressure until the auxiliary reservoir is recharged.

2. In an air brake system, the combination with the usual car brake complement including a triple valve and an auxiliary reservoir, of an automatically operating retaining valve having a valve seat therein with two adjacent ports opening exteriorly of the valve and having a port connection at their inner terminals, one of the ports being exteriorly connected to the exhaust of the triple valve and the other port always open to the atmosphere, the retaining valve also having air connection with the auxiliary reservoir, piston means in the retaining valve operating to move when the brakes are applied under maximum braking pressure, and a slide valve loosely engaged by a portion of the piston means and operated by the latter and directly movable over said ports to open and close them, the ports when closed by the slide valve obstructing the exhaust of the triple valve to the atmosphere and operating by the delayed movement thereof to open the exhaust port to the atmosphere whereby the brakes may be held under maximum pressure until the auxiliary reservoir is recharged.

3. In an air brake system, the combination with the usual brake complement of a car including a triple valve and an auxiliary reservoir, of an automatically operating retaining valve connected to the auxiliary reservoir and having two adjacent ports therethrough provided with a connecting port at their inner terminals, one of these ports being exteriorly connected to the exhaust of the triple valve and the other port open to the atmosphere, said retaining valve being also provided with a piston and rod mounted to freely move therein, the piston rod loosely engaging a slide valve coöperating with the ports for checking the exhaust from the triple valve to the atmosphere to maintain a maximum braking pressure on the brakes for a certain length of time.

4. In an air brake system, the combination with the usual brake complement of a car including a triple valve, and auxiliary reservoir, and train pipe, of an automatically operating retaining valve having a pipe connection to the auxiliary reservoir, said retaining valve also having a valve seat therein with two adjacently situated ports connected at their inner terminals, the one port being exteriorly connected by a pipe to the exhaust of the triple valve and the other port always being fully open to the atmosphere, the retaining valve also having therein a freely movable piston and rod and a slide valve loosely engaged by the piston rod and coöperating with the said ports for checking the exhaust from the triple valve to the atmosphere to maintain a maximum braking pressure for a certain length of time, and a rear end release valve mounted in the pipe connection between the triple valve exhaust and the one port of the retaining valve.

5. In an air brake system, the combination with the usual car brake complement including a triple valve and an auxiliary reservoir, of an automatically operating retaining valve having independent connections to the auxiliary reservoir and the exhaust of the triple valve, and also having a slide valve loosely mounted therein and a piston and piston rod loosely engaging the said slide valve and operating the latter to obstruct the atmospheric release of the exhaust from the triple valve and hold the brakes applied under maximum braking pressure until the auxiliary reservoir is recharged, the retaining valve having an air storage chamber in rear of and fully open to the piston and having communication at intervals with the interior of the retaining valve in advance of the piston for operating said piston when the air pressure in advance thereof is reduced or lowered relatively to the pressure of the air in said storage chamber.

In testimony whereof I have hereunto set my hand in presence of two subscribing witnesses.

FRANK S. CRAVENS.

Witnesses:
CHAS. S. HYER,
EDWARD P. REA.